United States Patent [19]

Barthelmes et al.

[11] Patent Number: 4,948,530
[45] Date of Patent: Aug. 14, 1990

[54] METHOD TO MAKE A REFLECTIVE COATING ON HIGH-PRESSURE DISCHARGE LAMPS

[75] Inventors: Clemens Barthelmes; Andreas Hohlfeld; Lothar Vollmer, all of Berlin, Fed. Rep. of Germany

[73] Assignee: Patent-Treuhand-Gesellschaft fur elektrische Gluhlampen m.b.H., Munich, Fed. Rep. of Germany

[21] Appl. No.: 400,152

[22] Filed: Aug. 29, 1989

[30] Foreign Application Priority Data

Sep. 26, 1988 [DE] Fed. Rep. of Germany ....... 3832643

[51] Int. Cl.$^5$ .................. C01B 33/00; C01G 25/00; C09D 1/00
[52] U.S. Cl. ................ 252/520; 106/287.17; 106/287.19; 106/311; 106/450; 252/352; 350/1.6; 350/1.7
[58] Field of Search .............. 427/66; 106/287.17, 106/311, 287.19, 450, 499; 313/421; 350/1.6, 1.7; 252/352, 520

[56] References Cited

U.S. PATENT DOCUMENTS

| | | | |
|---|---|---|---|
| 2,495,306 | 1/1950 | Zurcher | 106/287.19 |
| 3,889,142 | 6/1975 | Keeffe | 313/635 |
| 3,928,059 | 12/1975 | Ferrigno | 106/467 |
| 3,955,987 | 5/1976 | Schaar et al. | 427/326 |
| 3,959,524 | 5/1976 | Keeffe | 427/106 |
| 4,081,714 | 3/1978 | Mossel et al. | 313/635 |
| 4,308,186 | 12/1981 | Schreurs et al. | 106/287.19 |
| 4,529,541 | 7/1985 | Wilms et al. | 252/174.21 |
| 4,689,172 | 8/1987 | Czeiler et al. | 427/67 |
| 4,824,807 | 4/1989 | Blount | 501/53 |

FOREIGN PATENT DOCUMENTS

| | | | |
|---|---|---|---|
| 2425238 | 12/1974 | Fed. Rep. of Germany | 106/450 |
| 0089703 | 7/1981 | Japan | 350/1.6 |

*Primary Examiner*—Paul Lieberman
*Assistant Examiner*—John Boyd
*Attorney, Agent, or Firm*—Frishauf, Holtz, Goodman & Woodward

[57] ABSTRACT

In the method for making a reflective coating at the ends of the discharge vessel of a high-pressure discharge lamp, the suspension for making the coating includes from 0.5 to 5% by weight of a highly dispersed pyrogenic silicic acid - aluminum oxide mixture, 0 to 5% by weight of acetic acid, 0 to 1% by weight of boric acid, 24 to 55% by weight of water, and zirconium oxide to make up 100% by weight. By using the novel suspension, the previously required process steps of baking and white-burning can be omitted.

5 Claims, No Drawings

METHOD TO MAKE A REFLECTIVE COATING ON HIGH-PRESSURE DISCHARGE LAMPS

The invention relates to a method for producing a protective coating at the ends of the discharge vessel of a high-pressure discharge lamp.

BACKGROUND OF THE INVENTION

The discharge vessel of high-pressure discharge lamps, in particular those filled with a metal halide, have a reflective coating at the ends. This coating regulates the heat balance and thus determines the constancy of the color temperature and the average life of the lamp.

Previously, suspensions containing silica sol and/or glass powder have been used as a paste for preparing reflective coatings. To adjust the paste to a suitable viscosity and prevent sedimentation, organic additives such as cellulose ether are added to the binder in relatively large quantities. However, during the manufacture of the lamp, these organic additives must be eliminated completely. If the additives are not completely eliminated, they leave a residue which makes the reflective coating look grey, and so do not enable optimal heat reflection of the kind a white coating provides. To eliminate the organic additive residue, however, requires baking of the coating for a long period, as well as an additional "white-burn operation" lasting several minutes, in which air or oxygen is added and the residues are oxidized.

BRIEF DESCRIPTION OF THE INVENTION

The object of the invention is to develop a simple method of forming a white reflective coating at the ends of the discharge vessel which avoids or eliminates the time-consuming baking and "white-burn" oxidizing of the coating necessary to remove the large amount of organic additives used in the known pastes.

Briefly, this is accomplished by providing an aqueous reflector suspension composition of silicic acid—aluminum oxide, acetic acid, boric acid and zirconium oxide. This is applied to the lamp and baked and sintered to form the reflective coating.

DETAILED DESCRIPTION

A suspension according to the present invention comprises:

0.5 to 5% by weight of a silicic acid—aluminum oxide mixture,
0 to 5% by weight of acetic acid,
0 to 1% by weight of boric acid,
24 to 55% by weight of water, and zirconium oxide to make up 100% by weight.

Preferably, there is at least 0.5% acetic acid and at least 0.1% boric acid.

More preferably, the composition comprises:

0.5 to 3% by weight of the highly dispersed pyrogenic silica acid—aluminum oxide mixture,
0.5 to 2.5% by weight of acetic acid,
0.1 to 0.5% by weight of boric acid,
30 to 50% by weight of water, and balance to make up 100% by weight zirconium oxide.

The aluminum oxide proportion of the silicic acid—aluminum oxide mixture, should lie between 0 and 30%, more preferably 5 and 30% by weight with the rest being the silicic acid.

Since this composition does not contain the large amounts of organic additives required by the art, time-consuming baking or oxidation process ("white-burning") steps are not required. Moreover, by using the highly dispersed pyrogenic silicic acid—aluminum oxide mixture with a proportion of 0 to 30% by weight of aluminum oxide and preferably at least 5% by weight as a binder, a viscosity is attained that particularly favors applying the paste by spray methods. The suspension is not sensitive to freezing, and even when stored for relatively long periods of several months does not undergo any loss in quality.

A highly preferred composition in terms of the spraying performance and adhesion to the wall of the arc tube or discharge lamp is obtained with a suspension composed of 1.5% by weight of the silicic acid—aluminum oxide mixture, 1.4% by weight of acetic acid, 0.2% by weight of boric acid, 59.4% by weight of zirconium oxide and 37.5% by weight of water, with the aluminum oxide proportion in the silicic acid—aluminum oxide mixture being 16% by weight.

To attain a uniform layer thickness of the reflective coating on the ends of the discharge vessel, the arc tube or discharge lamp is heated above the boiling point of water up to about 300° C. and preferably to approximately 250° C., before the suspension is sprayed on with a spray gun.

After a dry coating is formed, the coating is sintered. Sintering is preferably by successive heating to approximately 1000° C., until the coating is smudgeproof.

In comparison tests, it has been found that for making a reflective coating using the novel suspension composition on a rotary machine, a cycle time of 5.5 seconds per position is required. By comparison, with the previously used suspension of silica sol, ammonia, cellulose ethers, zirconium oxide and water, a cycle time of 11 seconds is required. Moreover, the prior coatings had to be "whiteburned" to remove impurities or residue caused by usual organic additive binders used in the art which left a gray discoloration. This required heating in air or oxygen to oxidize the binders. In practice, this requires an additional process step (on a different machine) of approximately 120 seconds. Overall, the manufacture of a two-sided reflector coating using the new suspension takes about 80 seconds, while with the prior art it required about 300 seconds.

When a paste according to the invention having the above-recited ranges by weight for the component substances is used, a reflective coating at the ends of the discharge vessel is obtained that comprises from 0.8 to 10% by weight of a silicic acid—aluminum oxide mixture, 0 to 1.3% by weight of boron oxide, and the rest is zirconium oxide. With the highly preferred composition disclosed above, a reflective layer is obtained that is composed of 2.5% by weight of the silicic acid—aluminum oxide mixture, 0.2% by weight of boron oxide, and 97.3% by weight of zirconium oxide.

The above is illustrative of the invention. Other embodiments, as would be obvious therefrom are also included. The invention is defined in the following claims.

What is claimed is:

1. A precursor paste suspension for forming a reflective coating at the end of a discharge vessel of a high-pressure discharge lamp by spraying the suspension onto the end of the discharge vessel and sintering said suspension consisting essentially of 0.5–5% by weight silicic acid—aluminum oxide which contains 5 to 30% by weight aluminum oxide 0.5% to 5% acetic acid, 0.1% to 1% boric acid, 24% to 55% of water, and zirconium oxide to make up 100%, all percentages by weight.

2. The suspension of claim 1, wherein the suspension contains 1.5% of the silicic acid—aluminum oxide mixture, 1.4% of acetic acid, 0.2% of boric acid, 59.4% of zirconium oxide and 37.5% of water, all percentages by weight.

3. The suspension of claim 1, wherein the suspension comprises 0.5 to 3% by weight of the highly dispersive pyrogenic silica acid—aluminum oxide mixture 0.5 to 2.5% by weight of acidic acid 0.1 to 0.5% by weight of boric acid 30 to 50% by weight of water balance to make up 100% by weight of zirconium oxide.

4. The suspension of claim 3, wherein the suspension contains 1.5% of the silicic acid—aluminum oxide mixture, 1.4% of acetic acid, 0.2% of boric acid, 59.4% of zirconium oxide and 37.5% of water, all percentages by weight.

5. The suspension of claim 4, wherein the aluminum oxide proportion in the silicic acid—aluminum oxide mixture is 16% by weight.

* * * * *